No. 632,637. Patented Sept. 5, 1899.
N. BROOKER.
MACHINE FOR CLEANING GRAIN.
(Application filed Apr. 29, 1898.)
(No Model.) 2 Sheets—Sheet 1.
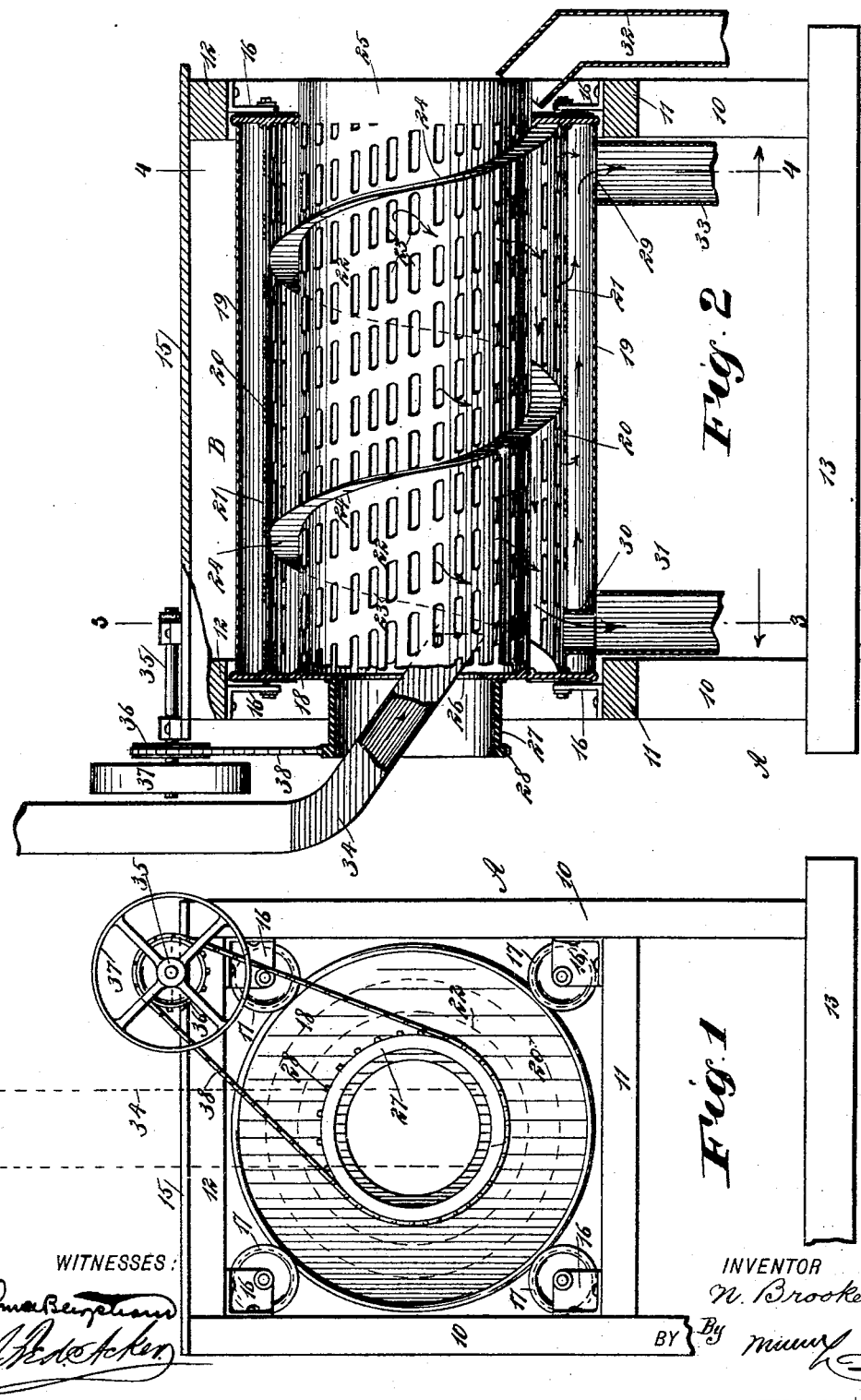
WITNESSES:
INVENTOR
N. Brooker
BY
ATTORNEYS.

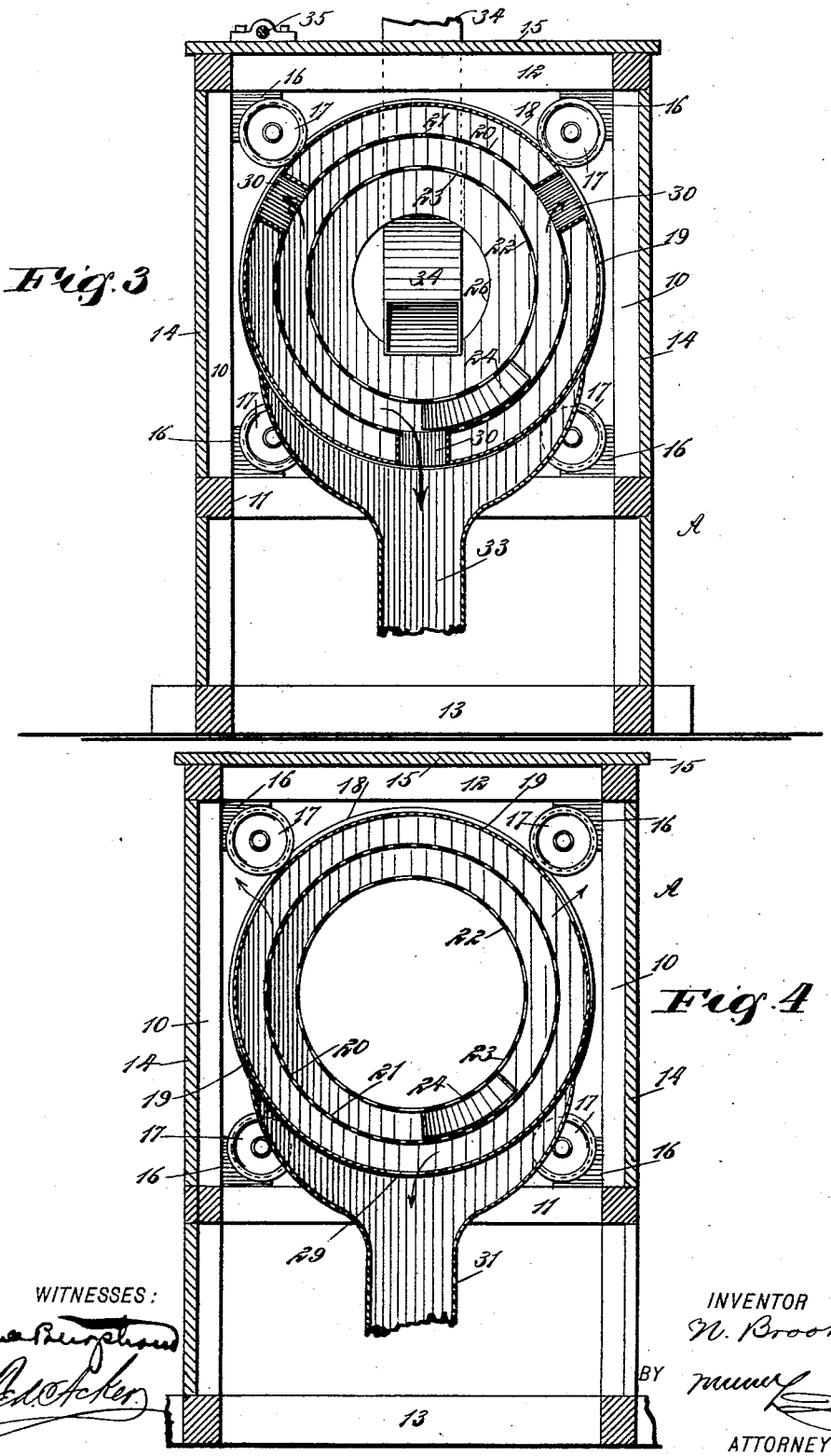

UNITED STATES PATENT OFFICE.

NORTON BROOKER, OF AGENCY, MISSOURI, ASSIGNOR TO HIMSELF, AND CHARLES H. SEAMAN, OF ST. JOSEPH, MISSOURI.

MACHINE FOR CLEANING GRAIN.

SPECIFICATION forming part of Letters Patent No. 632,637, dated September 5, 1899.

Application filed April 29, 1898. Serial No. 679,230. (No model.)

*To all whom it may concern:*

Be it known that I, NORTON BROOKER, of Agency, in the county of Buchanan and State of Missouri, have invented a new and Improved Machine for Cleaning Grain, of which the following is a full, clear, and exact description.

The object of the invention is to provide a simple and durable machine especially adapted for cleaning grain, the machine being of the rotary type and so constructed that the chaff and any bulky refuse material will be delivered from the tail end of the machine shortly after entering it and the smaller seed and dust will be delivered to a chute at the exterior of the reel into which the grain is fed, while the good grain will be retained in the reel and delivered automatically to outlets, from whence the grain may be conducted to any desired point.

Another object of the invention is to so construct the device that it will operate with the least possible amount of friction and can be conveniently superintended by one person.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in all the figures.

Figure 1 is a view of the head or receiving end of the machine. Fig. 2 is a longitudinal vertical section through the machine. Fig. 3 is a transverse section taken on the line 3 3 of Fig. 2 looking in direction of the head; and Fig. 4 is a transverse vertical section taken on the line 4 4 of Fig. 2 looking in direction of the tail or delivery end of the machine.

The frame A of the machine is usually of rectangular shape and comprises uprights 10, connected by lower and upper cross-bars 11 and 12 and by suitable base-timbers 13. The sides 14 of the frame are usually and preferably closed, as shown in Figs. 3 and 4, as is likewise the top 15. The tail end of the frame is usually open, as is likewise the head end, but this latter end may be partially closed, if desired. Plates 16 are secured in the corners of the frame at the front and at the rear, and on each of the plates 16 a guide or antifriction-wheel 17 is mounted to revolve. Under this construction four antifriction-wheels are provided at the front and at the rear end of the machine, and these antifriction-wheels are adapted to receive and support the cleaning-reel B. This cleaning-reel is preferably constructed as shown, consisting of two heads 18, the peripheral portions whereof are fitted to enter peripheral grooves in the supporting or antifriction wheels 17. The heads are connected, first, by an outer casing 19, which is a plain casing and is usually made of sheet metal; second, by an intermediate casing 20, spaced from the outer casing and provided with slots 21, and a third or inner casing 22, which is provided with slots 23 of greater size than the slots in the intermediate casing 20. These slots may be spirally arranged, as illustrated, or they may be otherwise grouped. The slots 23 in the inner casing are of such size as to permit the passage of a good grain of wheat, for example, whereas the slots in the intermediate casing 20 are of such size as to admit only small seed or broken grain or dust. The various casings are secured to the heads in any suitable or approved manner, and the heads may be connected and drawn against the ends of the casings by rods, if so desired.

A spiral rib 24 is formed upon the exterior of the inner casing 22. This spiral rib extends from head to head and is of such width that it will extend from the outer face of the inner casing to the inner face of the intermediate casing, as is best shown in Fig. 2. More than one spiral rib 24 may be employed if in practice it is found desirable.

The inner casing 22 at its rear or delivery end is provided with a plain extension 25, which extends out through an opening in the central portion of the rear head of the reel. The front head of the reel is provided with an opening 26, leading into the interior of the inner casing 22, and the opening 26 in the front head of the reel is surrounded by a collar 27, upon the periphery of which a gear 28 is formed.

Usually near the delivery end of the reel openings 29 are made in the outer casing 19, and large openings are likewise made in the intermediate casing near the front end of the reel, which latter openings are surrounded by collars 30, the said collars passing through openings made in the outer casing. The collars constitute outlets for the grain confined between the inner and the intermediate casings. The collars or outlets 30 for the cleaned grain are adapted to register with a suitably-formed chute 31, located at the bottom of the reel, and as the reel is revolved the various outlets 30 will cause the grain to enter the chute 31, from whence it may be conducted to any desired point.

A chute 32 is located at the delivery or tail end of the inner cylinder or casing 22 and receives the chaff or other refuse matter that cannot pass through the openings in the said inner casing, whereas the small grain and dust received upon the intermediate casing will pass through the slots in said casing and will fall upon the outer casing, the said material finding its way through the outlet-openings 29 into a chute 33, located in the path of the said openings 29.

As the machine revolves it is evident that the grain will be thoroughly and expeditiously cleaned and that the cleaned grain will remain between the intermediate and inner casings until said grain is directed by the spiral rib 24 to the outlet-openings 30.

The reel may be driven in any approved manner. As illustrated, a shaft 35 is mounted on the top of the frame, the said shaft being provided with a sprocket-wheel 36 and a driving-pulley 37, and the sprocket-wheel is connected by a belt 38 with the gear on the collar at the front of the reel.

The grain to be cleaned is fed into the inner casing through a suitable chute 34, which enters the inner casing at the opening 26 in the forward end of the machine.

Having thus described my invention, I claim as new and desire to secure by Letters Patent—

In a machine for cleaning grain, the combination, with a frame, and antifriction-rollers located at the front and at the rear of the frame, of a reel comprising opposing heads having central openings, the peripheries of the heads bearing upon the said antifriction-rollers, an outer imperforate casing extending from head to head and provided with an outlet at its rear end, an inner and an intermediate perforated casing likewise extending from head to head, the inner casing having larger perforations than the intermediate one and being open at each end the intermediate casing having an outlet leading through the outer casing, a spiral rib mounted upon the exterior of the inner casing and extending from head to head, a driving-shaft, and a driving connection between the driving-shaft and one of the said heads, for the purpose specified.

NORTON BROOKER.

Witnesses:
R. L. BOWLIN,
EUGENE W. MILLER.